United States Patent [19]
Tagariello

[11] Patent Number: 6,135,467
[45] Date of Patent: Oct. 24, 2000

[54] BUCKET STAND

[76] Inventor: Philip Tagariello, 1251 Chalcedony St., San Diego, Calif. 92109

[21] Appl. No.: 09/274,485

[22] Filed: Mar. 22, 1999

[51] Int. Cl.⁷ ....................................................... B62B 3/04
[52] U.S. Cl. ........................................ 280/79.5; 280/79.11
[58] Field of Search ............................... 280/79.5, 79.11, 280/87.01; 16/47; 248/346.1; 220/DIG. 1; 24/488

[56] References Cited

U.S. PATENT DOCUMENTS

| | | | |
|---|---|---|---|
| 5,472,220 | 12/1995 | Stephan | 280/79.5 |
| 5,713,583 | 2/1998 | Hansen | 280/79.5 |
| 5,791,667 | 8/1998 | Kroll | 280/79.5 |
| 5,806,867 | 9/1998 | Hampton | 280/79.5 |

*Primary Examiner*—Richard M. Camby
*Attorney, Agent, or Firm*—Steins & Associates

[57] ABSTRACT

An Improved Bucket Stand is disclosed. The stand includes a base and at least one receptacle extending generally vertically, provided for the storage of elongate items. The preferred stand includes clamp means for attaching to the bucket or pail, and in other embodiments, a wheel or castor on its bottom to provide the bucket with mobility. The stand might also include the ability to insert elongate tubes into one of the previously-mentioned receptacles in order to permit the stand assembly to be collapsible for storage. Finally, the stand also may include a generally circular base, and still further include an embodiment wherein a plurality of peripheral receptacles be formed in the base for further storage utility.

20 Claims, 8 Drawing Sheets

BUCKET STAND

BACKGROUND OF THE INVENTION

1. Field of the Invention

This invention relates generally to containers and organizers and, more specifically, to an Improved Bucket Stand.

2. Description of Related Art

Buckets have been used for years in trades, around the homes, in industry and sports, to carry and store materials of all kinds. The common five gallon bucket is used universally to carry material in the rear of pickup trucks, on the decks of moving boats, the kitchen floor, high scaffolds, etc. Tipping and spillage is a common problem due to vehicle movement or from bumping into other mobile objects (e.g. thrashing fish). It is uncommon to find a painter that hasn't tipped over a paint pail. What is needed is a device to stabilize buckets and pails.

A platform to increase the stability of a free-standing bucket has been disclosed in U.S. Pat. No. Des. 383,271. The problem with the device disclosed by the '271 patent is that it is merely a base for a bucket; the base does not permit portability, and further does not add stability to the bucket itself.

Another problem with using a conventional bucket as a storage container is its inability to segregate items. A bucket might be used to carry fishing poles, painting equipment or other implements, but the items cannot be organized reliably. To be truly useful and convenient, the items should be safely organized so that the implements are at the individual's disposal.

Wheeled bucket devices appear in the prior art, however, they appear to be permanently-installed, specialized (single-purpose) designs. In particular, the devices of Stolzman and Ames, U.S. Pat. Nos. 5,123,667 and 4,294,374, respectively, apply only to the handling of industrial drums (e.g. 55 gallon). The "Bucket Dolly" of Stephan, U.S. Pat. No. 5,472,220 describes another single-purpose device which simply defines a rolling base upon which a bucket might rest and be clamped into. The Stephan device does not include the ability to organize items while converting the bucket or pail into a portable container. Still further, the Finley device, U.S. Pat. No. 5,433,463 attempts to solve the problem by essentially providing a hand cart for buckets. Despite its complexity, the Finley device fails to offer any benefits in organizing the contents of the bucket. What is still needed, therefore, is a device to permit a bucket, pail or similar container to be more stable while also optionally adding roll-around capability as well as additional storage receptacles for organizing a variety of articles.

SUMMARY OF THE INVENTION

In light of the aforementioned problems associated with the prior devices, it is an object of the present invention to provide an Improved Bucket Stand. The preferred stand will permit a user to convert a conventional bucket, pail or other container into a more useful storage vessel. It is an object that the stand include a base and at least one receptacle extending generally vertically, provided for the storage of elongate items. It is a further object that the stand include clamp means for attaching to the bucket or pail, and possibly a wheel or castor on its bottom to provide the bucket with mobility. It is a still further object that the stand include the ability to insert elongate tubes into one of the previously-mentioned receptacles in order to permit the stand assembly to be collapsible for storage. It is a final object that the stand include a generally circular base, and further include an embodiment wherein a plurality of peripheral receptacles be formed in the base for further storage utility.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Improved Bucket Stand.

Figure 1:
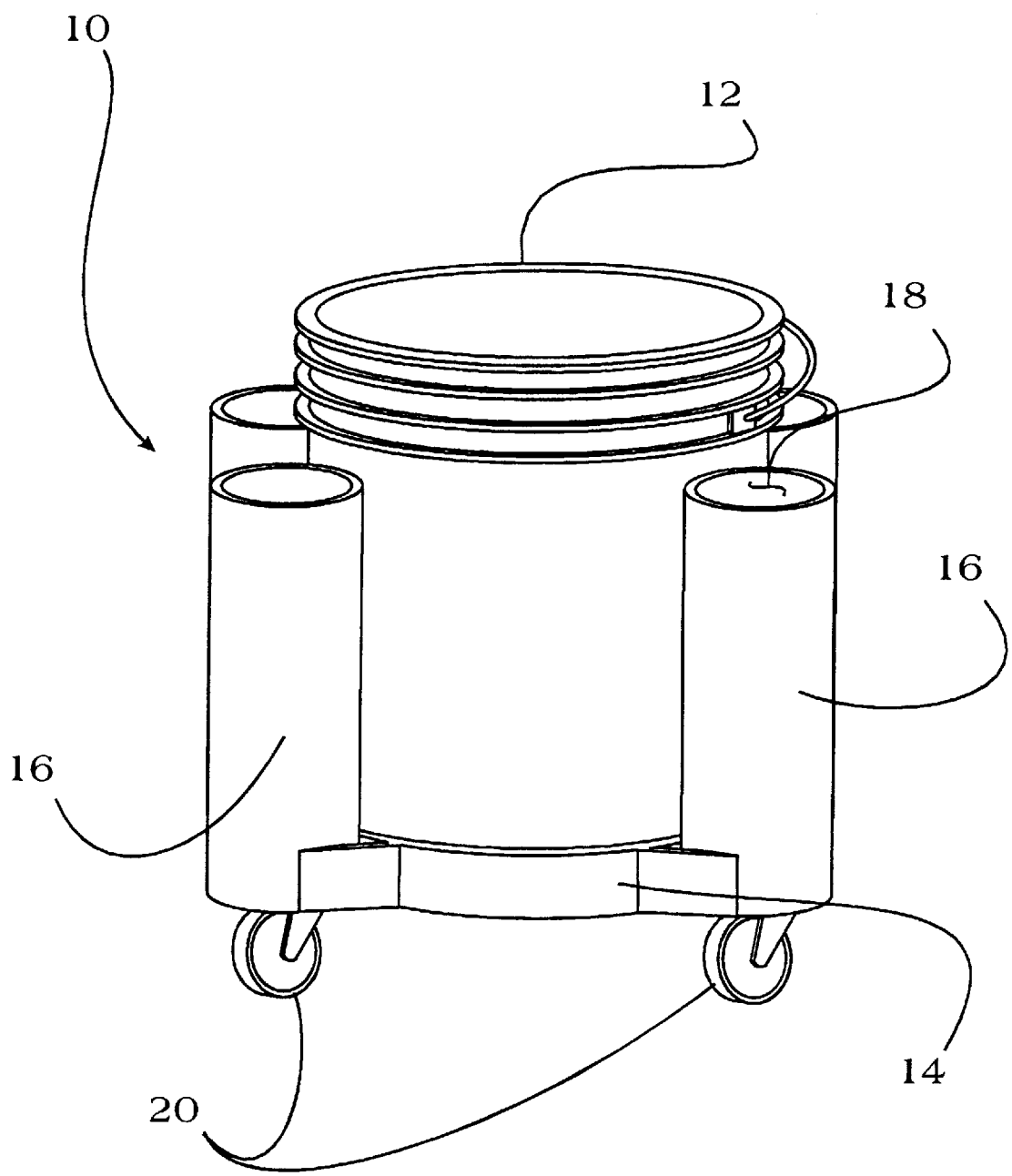
FIG. 1 is a perspective view of a preferred embodiment of the improved bucket stand of the present invention, shown with a bucket inserted therein.

The present invention can best be understood by initial consideration of FIG. 1. FIG. 1 is a perspective view of a preferred embodiment of the improved bucket stand 10 of the present invention. As can be seen, the stand 10 is designed to accept a bucket 12 or pail therein and attach thereto. The stand 10 preferably comprises a generally circular base 14, around which are disposed a plurality of receptacles 16. Each of the receptacles 16 is typically defined by an aperture 18 at the top through which articles might be inserted. Furthermore, the stand 10 might include a plurality of wheel means 20 for permitting the stand 10 to be rollable. The wheel means 20 might be of any sort conventional in the art, including the double-action (horizontal and vertical rotation) "casters" shown here. Furthermore, the casters might be removable as well as being "lockable" to prevent rotation; both features being well-known in the art.

The base 14 is preferably configured to clamp onto the bucket 12, such as by a screw and wingnut arrangement, for the purposes of simplicity and reliability, however other clamping means are conceived of. The receptacles 16 and base 14 might be available in a variety of shapes and sizes, such that the stand 10 can accommodate a variety of bucket 12 shapes and sizes. It should further be understood that the stand 10 might include ring inserts for inserting between the base 14 and the bucket 12 to permit smaller buckets 12 to be held firmly in place.

The stand 10 might be constructed from decay- and stain-resistant material, such as plastic, metal or other durable material.

Figure 2:
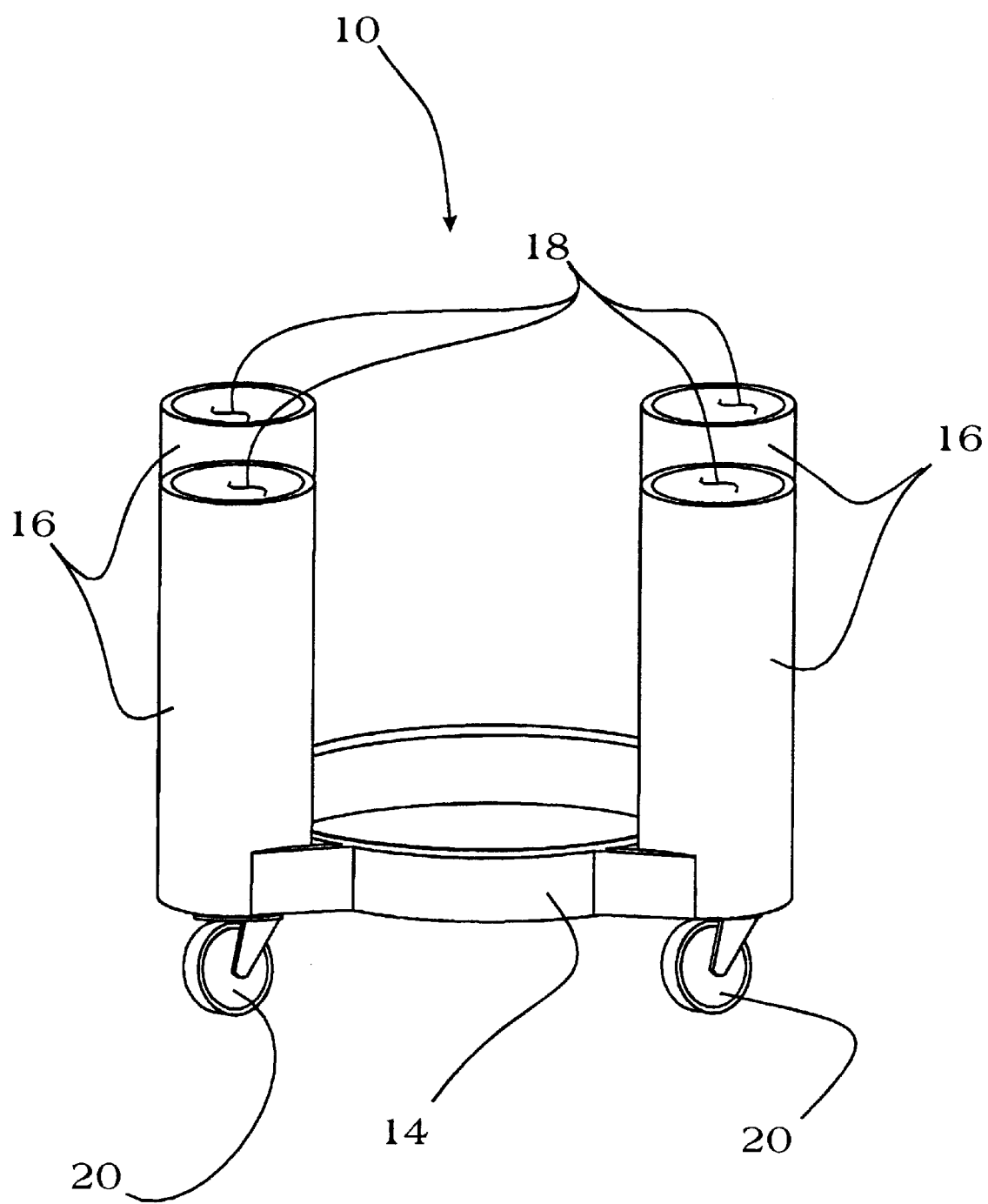
FIG. 2 is a perspective view of the bucket stand of FIG. 1, shown without a bucket installed.

Now turning to FIG. 2, we might discuss the present invention in more depth. FIG. 2 is a perspective view of the bucket stand 10 of FIG. 1, shown without a bucket installed. As can be seen here, there are four receptacles 16, arranged in spaced relation around the periphery of the base 14. Other shapes and numbers of receptacles 16 might be used, such as an embodiment having two or three or five receptacles 16. As should be appreciated, the bucket (see FIG. 1) is held in place by an interference fit with the inner surface 22 of the base 14. In this manner, the bottom of the base 14 can remain open; thereby making the stand 10 more compact, such as for stacking and/or nesting.

Figure 3:
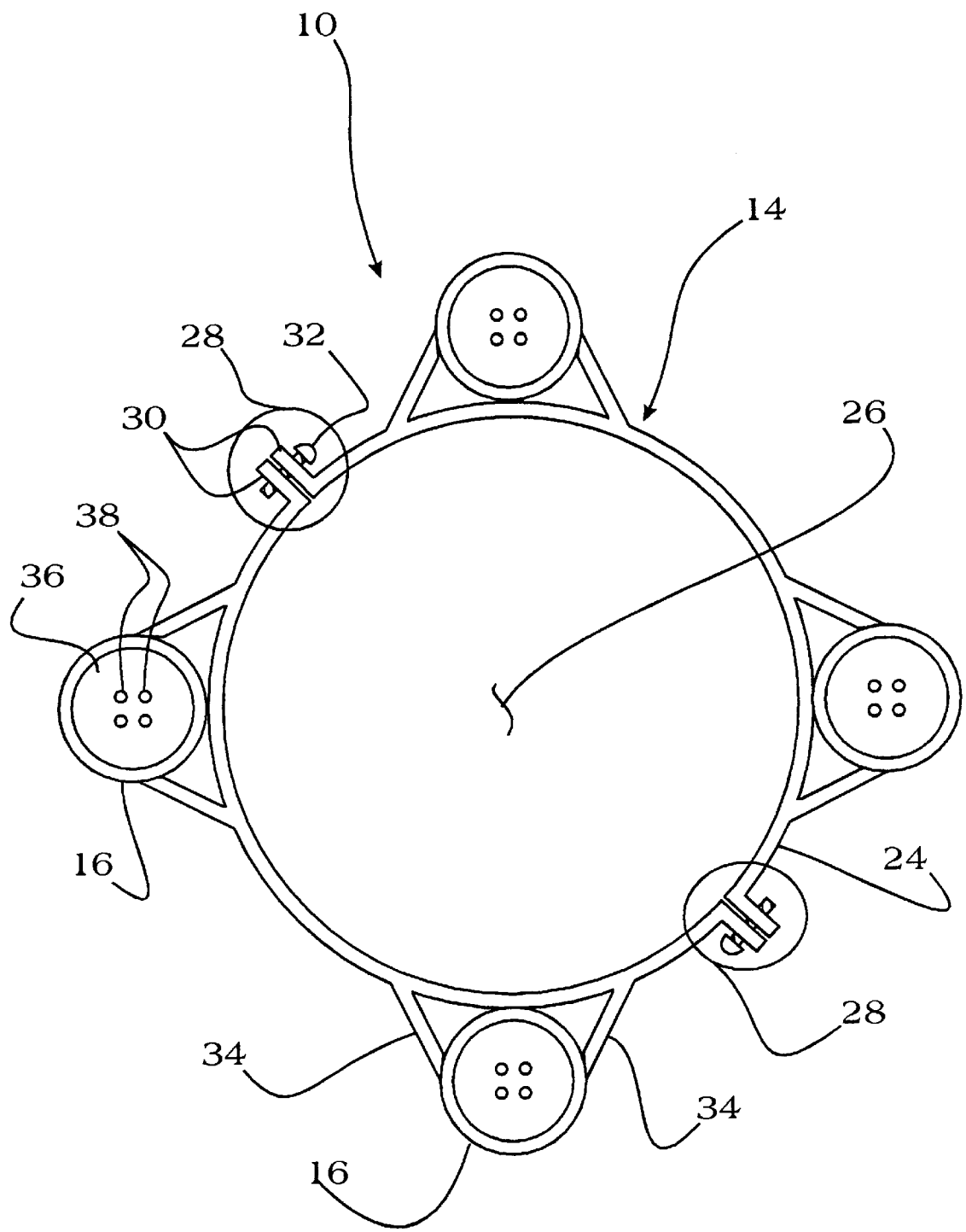
FIG. 3 is a top view of the bucket stand of FIGS. 1 and 2.

If we now examine FIG. 3, we can better understand the unique design of the present invention. FIG. 3 is a top view of the bucket stand 10 of FIGS. 1 and 2. As discussed above in connection with FIG. 2, the base 14 comprises a ring 24 formed around a base aperture 26. The base aperture 26 can be a variety of sizes and shapes, depending upon the desired application (and bucket or pail), and is circumferentially adjustable via actuation of the clamp means 28.

The preferred clamp means 28 comprises a pair of fins 30 formed in the ring 24, and with an aperture therethrough (not shown) to accept a bolt 32 or similar article. In operation, therefore, once the bucket (see FIG. 1) is inserted into the base aperture 26, the bolt 32 is turned to draw the fins 30 towards one another. As the fins 30 come closer, they will eventually cause the ring 24 to form an interference fit with the outer periphery of the bucket or pail (see FIG. 1). If one should desire to remove the bucket (see FIG. 1), he or she need merely loosen the bolt 32, such that the circumference of the ring is increased until such time as the bucket (see FIG. 1) is released.

As can be further seen here, the receptacles 16 are preferably connected to the ring 24 by one or more struts 34 in order to insure that the receptacles 16 embody the requisite durability and rigidity under the expected rugged usage conditions. Furthermore, in this embodiment, the bottom 36 of the receptacle 16 is preferably closed, with the exception of a plurality of drains 38 passing therethrough to permit that easy drainage of the receptacle 16. In other embodiments, drains might not be included.

Figure 4:
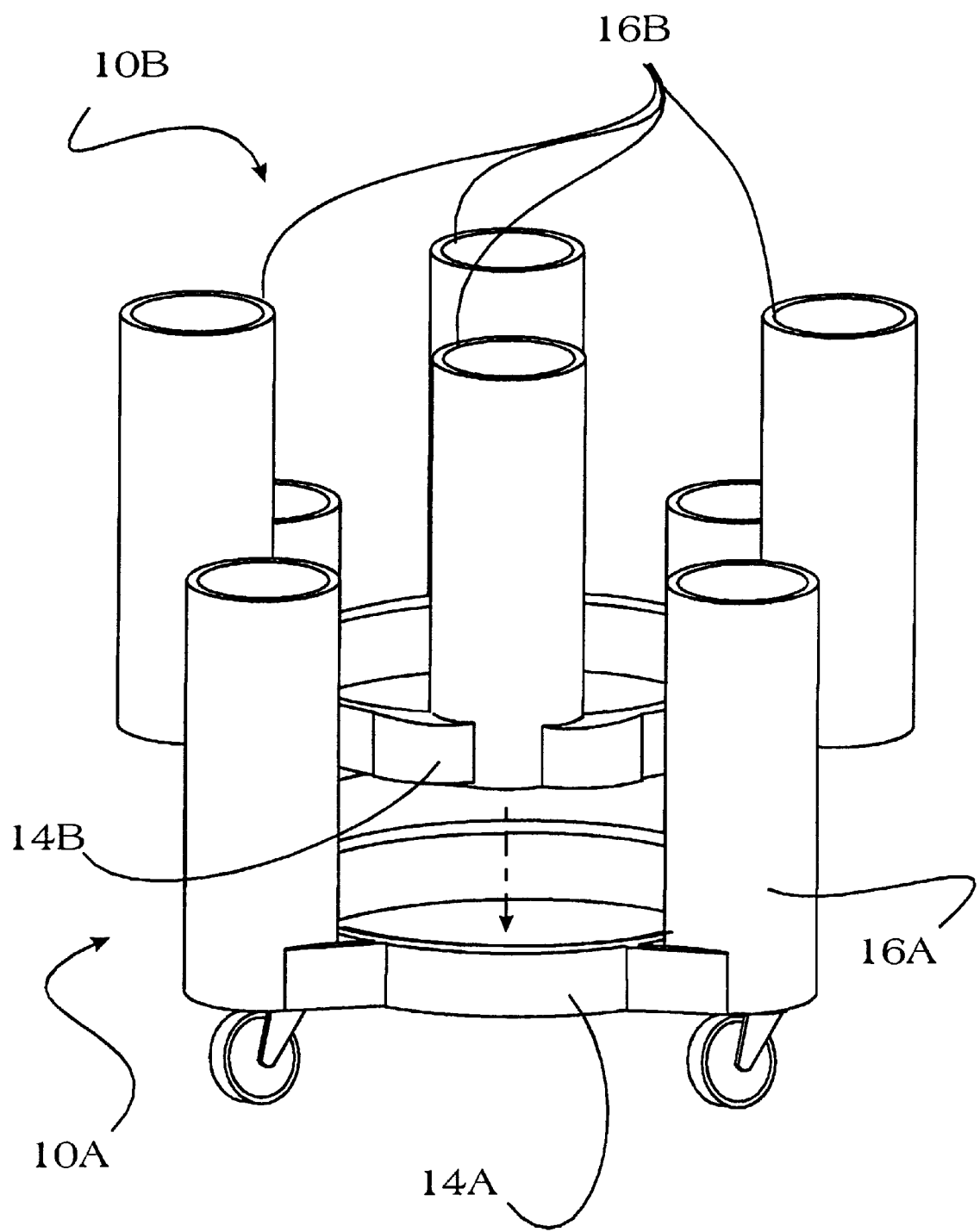
FIG. 4 is a perspective view of two bucket stands of FIGS. 1–3, depicting their nesting capability.

If we now turn to FIG. 4, we can see other benefits of the present invention. FIG. 4 is a perspective view of two bucket stands 10A and 10B of FIGS. 1–3, depicting their nesting capability. As can be seen, in order to "nest" a second stand 10B within a first stand 10A, the user need merely rotate the stand 10B until the receptacles 16B are aligned with the gaps between the receptacles 16A. The second base 14B will then slip easily down and onto the first base 14A in order to form a tight nest. In such a manner, the pair of stands 10A and 10B will afford the user with double the number of receptacles 16 into which articles may be placed. This will be particularly useful for retail display units.

Figure 5:
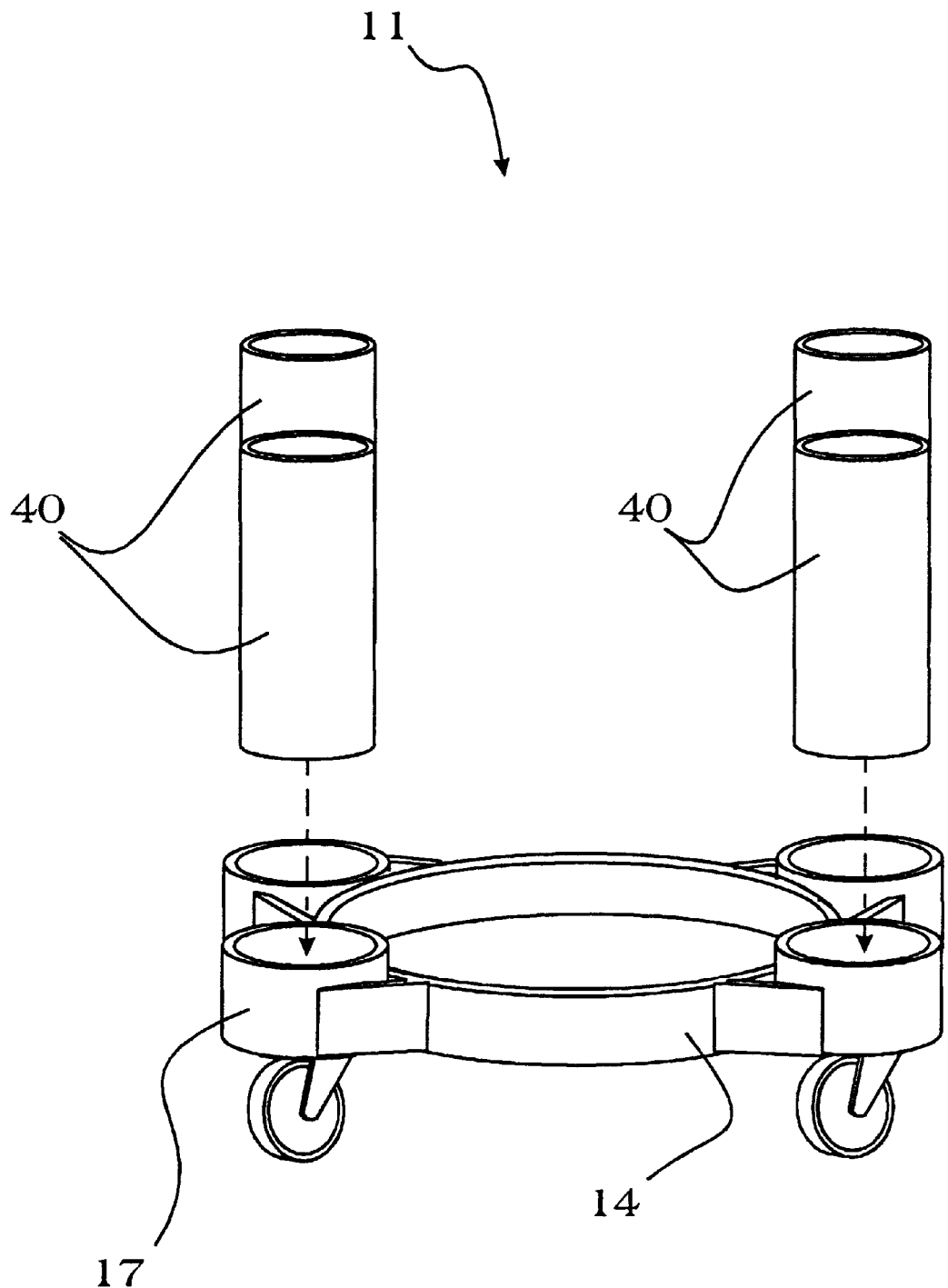
FIG. 5 is a perspective view of an alternate bucket stand of the present invention, including removable tubes.

Consideration of FIG. 5 will provide insight into another version or embodiment of the present invention. FIG. 5 is a perspective view of an alternate bucket stand 11 of the present invention. In this embodiment, the base 14 is just as previously-described, however, the alternate receptacles 17 are shorter than those disclosed above in connection with FIGS. 1–4; in other ways, the alternate receptacles 17 are substantially identical. In this case, however, each receptacle 17 has a corresponding tube 40 for insertion therein. The tubes 40 preferably slip into the receptacles 17 to form an interference fit, while still permitting the user to pull them out when they are not needed, particularly when the stand 11 is being stored or boxed. The tubes 40 could be formed from the same material as the rest of the stand 11, or even from clear plastic tubing, depending upon the particular application involved.

It should be understood that while the alternate receptacles 17 are shown here to be very short, they might also be just as long as those disclosed in connection with FIGS. 1–4; the inserted tubes 40 would provide even more length.

Figure 6:
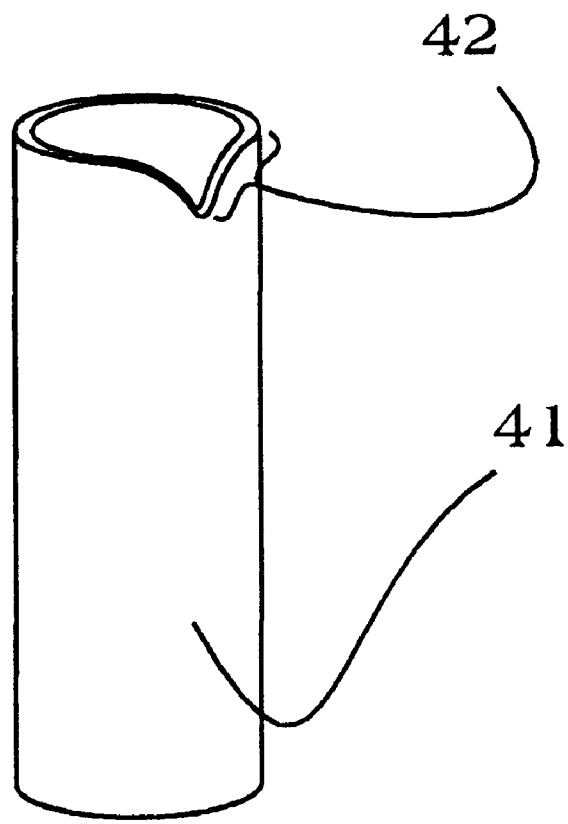
FIG. 6 is a perspective view of an alternative receptacle.

FIG. 6 is a perspective view of an alternative receptacle 41 that might be included in the design for situations where a long, thin article is to be stood up in the receptacle 41. In cases such as this (e.g. a fishing pole), notch 42 formed in the upper edge of the receptacle 41 will serve to steady the fishing pole, thereby preventing it from rolling around the upper edge of the receptacle 41. It should be known that while this embodiment calls for the notch 42 to be formed in the receptacle 41, it might be another embodiment to provide a tube (see FIG. 5) design that includes a notch.

Figure 7:
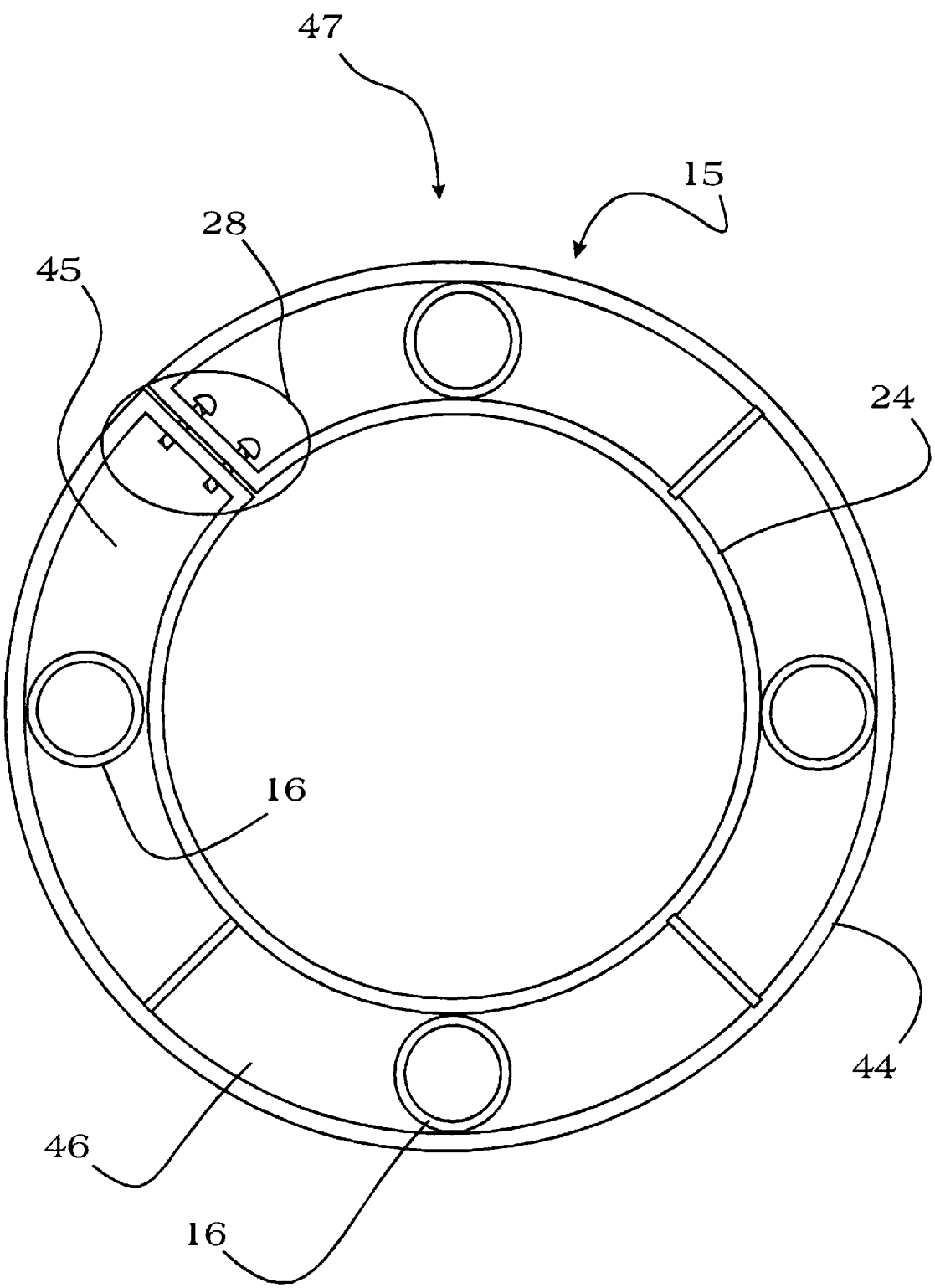
FIG. 7 is a top view of yet another preferred embodiment of the bucket stand of the present invention, depicting a plurality of peripheral receptacles.

If we now look at FIG. 7, we can examine yet another embodiment of the present invention. FIG. 7 is an alternate preferred embodiment of the bucket stand 47 of the present invention, depicting a plurality of peripheral receptacles 46. In this embodiment, the alternate base 15 is formed by the ring 24 and an outer ring 44 that are generally in parallel, spaced relation to one another. As with previous embodiments, the clamp means 28 for tightening the ring 24 around the bucket is provided here, however, the ring 24 might need to be separated from the base bottom 45 in the vicinity of the clamp means 28, in order to permit the ring 24 to be squeezed inwardly as the clamp means 28 is tightened. Again, a second (or more) clamp means 28 might be provided in order to permit the base 15 to break down into several pieces. Also depicted here are a plurality of dividers 51 for dividing the peripheral receptacles 46 onto two or more compartments. It would be preferable if the dividers 51 were removable to provide the most flexibility and utility.

As can be seen, the ring 24, outer ring 44 and base bottom 45 form a plurality of peripheral compartments 46, separated by the receptacles 16. In this manner, the stand 47 provides the user with the tall receptacles 16 for storing elongate objects, as well as the peripheral receptacles 46 for the storage of smaller or shorter items so that they are easier to see and handle.

Figure 8:
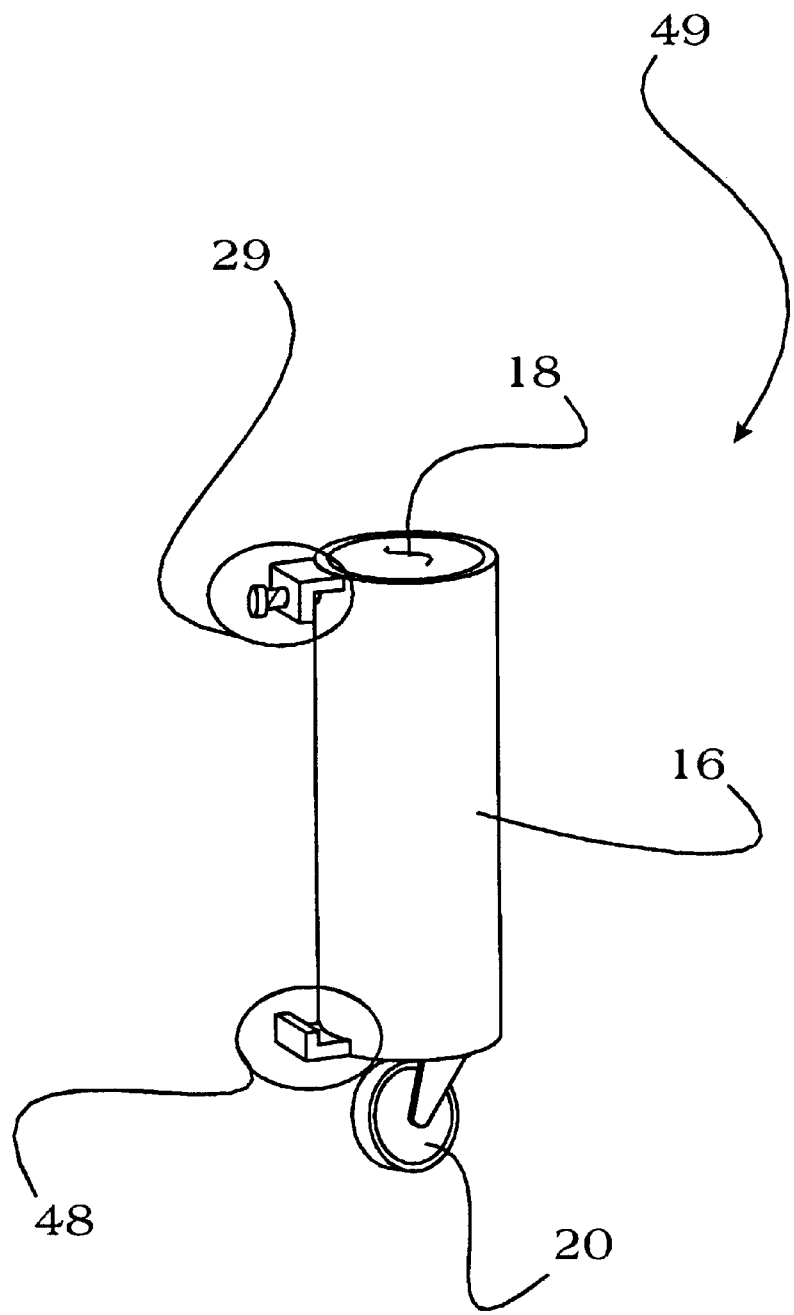
FIG. 8 is a perspective view of yet another preferred bucket stand of the present invention.

Finally, turning to FIG. 8, we can examine yet another beneficial form of the present invention. FIG. 8 is a perspective view of another preferred bucket stand 49 of the present invention. This stand 49 is formed from a receptacle 16, preferably having a wheel 20, and further defined by an alternative clamp means 29 extending inwardly from a location near the upper edge of the receptacle 20. The clamp means 29 is configured to reach over the upper lip of the bucket or pail and then clamp onto it. At the same time the alternate base 48 is provided to grasp the lower edge of the bucket or pail while the clamp means 29 is cinched down.

As can be imagined, the user might choose to dispose three or more of the alternative stand 49 devices around a bucket or pail in order to convert the stationary bucket into a rolling one, as well as providing the receptacles 16 for the organized storage of other items. The only limit is the amount of room around the periphery of the bucket or pail upon which to attach the stands 49.

It should also be understood that the receptacle 41 of FIG. 6 might be used as a tube (in place of the tubes 40 of FIG. 5), or in place of a receptacle 16 as shown in FIGS. 1–3, or even as an alternative for the receptacle 16 depicted in the alternative bucket stand 49 of FIG. 8.

Furthermore, while the stand 49 of FIG. 8 depicts a clamp means 29 for clamping to the bucket that comprises an angled-bracket-and-screw arrangement, it should be appreciated that other embodiments for attachment to the bucket are envisioned, including an embodiment wherein the clamp means 29 essentially comprises a pair of first apertures (not shown) formed in the side of the receptacle 16 through which screws (not shown) could pass, for threading into corresponding apertures formed in the bucket (not shown). Also, in order to facilitate installation and removal of said screws, corresponding second apertures might be provided on the facing side of the receptacle, such that a screwdriver might be inserted into the second aperture in order to reach the screw going through the first aperture (on the other side of the receptacle 16).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A stand for bucket-shaped containers, comprising:
   a generally circular base defining a generally circular inner surface and a generally circular outer surface, said inner surface configured to receive a bucket-shaped container, said inner surface configured to receive a bucket-shaped container; and
   at least one receptacle extending upwardly from the periphery of said base, each said at least one receptacle configured to receive and store articles therein.

2. The stand of claim 1, wherein said base further comprises clamping means for releasably clamping said stand to a bucket-shaped container.

3. The stand of claim 2, wherein said stand comprises four said receptacles in spaced relation around a periphery of said base.

4. The stand of claim 2, wherein each said receptacle is defined by an open top and a closed bottom side.

5. The stand of claim 4, wherein each said receptacle further includes ground-engaging wheel means extending downwardly from said bottom side.

6. The stand of claim 2, wherein each said receptacle further comprises:
   an open top defined by an edge; and
   a notch formed in said edge for receiving elongate articles therein.

7. The stand of claim 3, wherein said base and said receptacles are cooperatively configured to stackably accept another said stand.

8. The stand of claim 4, wherein each said receptacle defines an inner volume, and said bottom side further comprises at least one drain formed thereon to penetrate into said inner volume.

9. The stand of claim 8, wherein each said receptacle is further connected to said base by at least one strut member.

10. The stand of claim 2, further comprising at least one tube member, one said tube member being insertible into and removable from one said receptacle.

11. The stand of claim 2, wherein said base is further defined by at least one peripheral receptacle formed therein to receive and store objects.

12. A stand for buckets and pails, comprising:
    a base defined by a generally circular inner surface, said base being attachable to the exterior of the bucket or pail by inserting said bucket or pail into said inner surface of said base; and
    at least one receptacle extending from the periphery of said base, each said at least one receptacle configured to receive and store articles therein.

13. The stand of claim 12, further comprising at least one clamping means for releasably clamping said stand to a bucket or pail.

14. The stand of claim 13, wherein said clamping means comprises a pair of fins formed in said base and a bolt means urging said fins towards one another whereby as said fins are urged closer together, said base is more firmly attached to the bucket or pail.

15. The stand of claim 13, wherein said base defines a generally horizontally-aligned circular shape within which a bucket or pail might rest, and each said receptacle extends generally vertically.

16. The stand of claim 15, wherein said stand is further defined by a plurality of ground-engaging wheel means for permitting said stand to be rollable.

17. A container for objects, comprising:
    a base member, configured to be detachably attached to a conventional bucket or pail; and
    a plurality of receptacles extending upwardly from, and located in spaced relation around the periphery of said base, each said receptacle configured to receive and store articles therein.

18. The container of claim 17, further comprising a plurality of ground-engaging wheel means whereby said container is rollable.

19. The container of claim 18, wherein said base member further comprises:
    an inner wall for engaging a conventional bucket or pail;
    an outer wall in spaced relation to said inner wall; and
    a bottom member, said walls and bottom member forming a plurality of peripheral receptacles in said base.

20. The container of claim 17, wherein said receptacles are formed from tubular members having an open end and a closed end, said receptacles extending generally vertically from said base.

* * * * *